(12) United States Patent
Atwood et al.

(10) Patent No.: US 8,225,395 B2
(45) Date of Patent: Jul. 17, 2012

(54) SYSTEMS AND METHODS FOR DETECTING CHILD IDENTITY THEFT

(75) Inventors: Christopher Colin Puckett Atwood, Cumming, GA (US); Jan Elliott-Sinnock, Berkeley Lake, GA (US)

(73) Assignee: Equifax, Inc., Atlanta, GA (US)

( * ) Notice: Subject to any disclaimer, the term of this patent is extended or adjusted under 35 U.S.C. 154(b) by 657 days.

(21) Appl. No.: 12/270,197

(22) Filed: Nov. 13, 2008

(65) Prior Publication Data

US 2009/0126013 A1 May 14, 2009

Related U.S. Application Data

(60) Provisional application No. 60/987,561, filed on Nov. 13, 2007.

(51) Int. Cl.
*G06F 21/00* (2006.01)
(52) U.S. Cl. ......................................... 726/22
(58) Field of Classification Search .................... 726/22, 726/26, 28
See application file for complete search history.

(56) References Cited

U.S. PATENT DOCUMENTS

| | | | |
|---|---|---|---|
| 7,028,052 B2 | 4/2006 | Chapman et al. | |
| 2004/0255127 A1 | 12/2004 | Arnouse | |
| 2005/0105719 A1 | 5/2005 | Hada | |
| 2006/0200396 A1 | 9/2006 | Satterfield et al. | |
| 2006/0271633 A1* | 11/2006 | Adler | 709/206 |
| 2007/0093234 A1* | 4/2007 | Willis et al. | 455/410 |
| 2007/0177768 A1 | 8/2007 | Tsantes et al. | |
| 2008/0294689 A1* | 11/2008 | Metzger et al. | 707/104.1 |

OTHER PUBLICATIONS

"Family Identity Theft Protection & Identity Theft Prevention, How can LifeLock protect my kids and family", 2 pages, 2006.*
Todorova, Aleksandra, "Protecting Your Child's Identity", Smart Money, Published Aug. 2, 2007, pp. 1-2.*
International Application Serial No. PCT/US2008/083333, International Search Report and Written Opinion mailed Apr. 3, 2009.

(Continued)

*Primary Examiner* — William Goodchild
(74) *Attorney, Agent, or Firm* — Kilpatrick Townsend & Stockton LLP

(57) ABSTRACT

Embodiments of the present invention provide systems and methods for detecting an indication of a suspicious event associated with personal information of a child. Personal information representing a social security number of the child and a name of the child is received. Parent personal information representing contact information for a parent of the child is received. A child file for the child is created and stored on a computer-readable medium. The child file for the child includes the personal information representing the social security number of the child and the name of the child. The child file for the child is locked by associating an electronic notice to the child file for the child to prevent access to a database using at least part of the personal information of the child. The database includes credit data. The child file and the credit data is monitored for the indication of the suspicious event using the personal information representing the social security number of the child. A notification is transmitted to the parent using the parent personal information representing contact information for the parent. The notification is transmitted after detecting the indication of the suspicious event. The notification includes information associated with the indication of the suspicious event.

17 Claims, 4 Drawing Sheets

OTHER PUBLICATIONS

Website entitled Family Identify Theft Protection & Identity Theft Prevention, *How can LifeLock protect my kids and family*? 02 pages (Aug. 20, 2007) http://www.lifelock.com/lifelock-for-people/how-we-do-it/how-can-lifelock-protect-my-kids-and-family.

Website entitled Protecting Your Child's Identity (Consumer Action: Personal Finance), Aleksandra Todorova, *Protecting Your Child's Identity*, SmartMoney, 04 pages (Aug. 20, 2007) http://www.smartmoney.com/consumer/index.cfm?story=20070802.

National Alert Registry website titled 'Does a sexual offender live in your neighborhood,' 02 pages (Oct. 22, 2006) http://web.archive.org/web/20061022204835/http://www.nationalalertregistry.com/.

National Alert Registry Launches RegisteredOffendersList.org to Provide Information on Registered Sex Offenders, 03 pages (May 16, 2005) http://findarticles.com/p/articles/mi_m0EIN/is_2005_May_16/ai_n1378963/?tag=content....

Free Press Release titled 'National Alert Registry Offers Free Child Safety ? Safe From Harm Child Identification Kit,' 02 pages (Oct. 24, 2006) http://www.free-press-release.com/news/print-1161714995.html.

\* cited by examiner

SYSTEMS AND METHODS FOR DETECTING CHILD IDENTITY THEFT

CROSS-REFERENCE TO RELATED APPLICATIONS

This application claims priority to U.S. Provisional Application No. 60/987,561, filed Nov. 13, 2007 and entitled "Identity Theft Protection for Children," the entirety of which is hereby incorporated by reference.

FIELD OF THE INVENTION

The present invention relates generally to monitoring data and, in particular, protecting children by monitoring a database for suspicious events that may detrimentally affect a child and issuing notifications to the child's parent upon the detection of such suspicious events and/or preventing access to data associated with the child.

BACKGROUND

Identity theft occurs when a person or entity takes and uses another person's identification information as his or her own. Identity theft can include (1) financial identity theft, such as using another person's name and social security number ("SSN") to obtain goods or services, including credit, or (2) identity cloning, such as using another's personal information to assume his or her identity in daily life, including when accused of committing a crime. Costs associated with identity theft, particularly financial identity theft, are substantial and may be over $50 billion per year in the United States. Furthermore, identity theft disrupts a useful system in which individuals can use their personal information to identify themselves and provide some assurance to another party during a commercial or person-to-person transaction that recourse is available upon the non-performance of the identified individual.

Various systems and methods for theft protection have been implemented to reduce or eliminate identity theft. One such system and method involves monitoring an individual's credit file for events or changes. If an event or change occurs, the individual may be notified through a communication method such as email. The individual can then determine if the event or change is fraudulent and take appropriate action.

Such systems and methods are useful for detecting identity theft for individuals who have established a credit file. However, a credit file is established when an individual becomes an active credit user, which typically does not occur until persons are at least sixteen years old. Children (i.e., generally individuals age sixteen or less) or other individuals without credit files are more susceptible to identity theft because credit bureaus may have difficulty in monitoring for identity theft for those persons without a credit file. Systems and methods are desirable that can reduce or prevent identity theft for children who have yet to establish a credit file independently.

SUMMARY

In an embodiment, a method for detecting an indication of a suspicious event associated with personal information of a child is provided. Personal information representing a social security number of the child and a name of the child is received. Parent personal information representing contact information for a parent of the child is received. A child file for the child is created and stored on a computer-readable medium. The child file for the child includes the personal information representing the social security number of the child and the name of the child. The child file for the child is locked by associating an electronic notice to the child file for the child to prevent access to a database using at least part of the personal information of the child. The database includes credit data. The child file and the credit data is monitored for the indication of the suspicious event using the personal information representing the social security number of the child. A notification is transmitted to the parent using the parent personal information representing contact information for the parent. The notification is transmitted after detecting the indication of the suspicious event. The notification includes information associated with the indication of the suspicious event.

In some embodiments, personal information representing a home address for the child is received. Criminal data stored in the database is monitored for the indication of the suspicious event. The criminal data represents physical addresses of criminals. The notification transmitted to the parent includes the criminal data indicating that at least one of the criminals is associated with a physical address within a pre-set radius of the home address for the child.

This illustrative embodiment is mentioned not to limit or define the invention, but to provide examples to aid understanding thereof. Other aspects, advantages, and features of the present invention will become apparent after review of the entire application, including the following sections: Brief Description of the Drawings, Detailed Description, and Claims.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
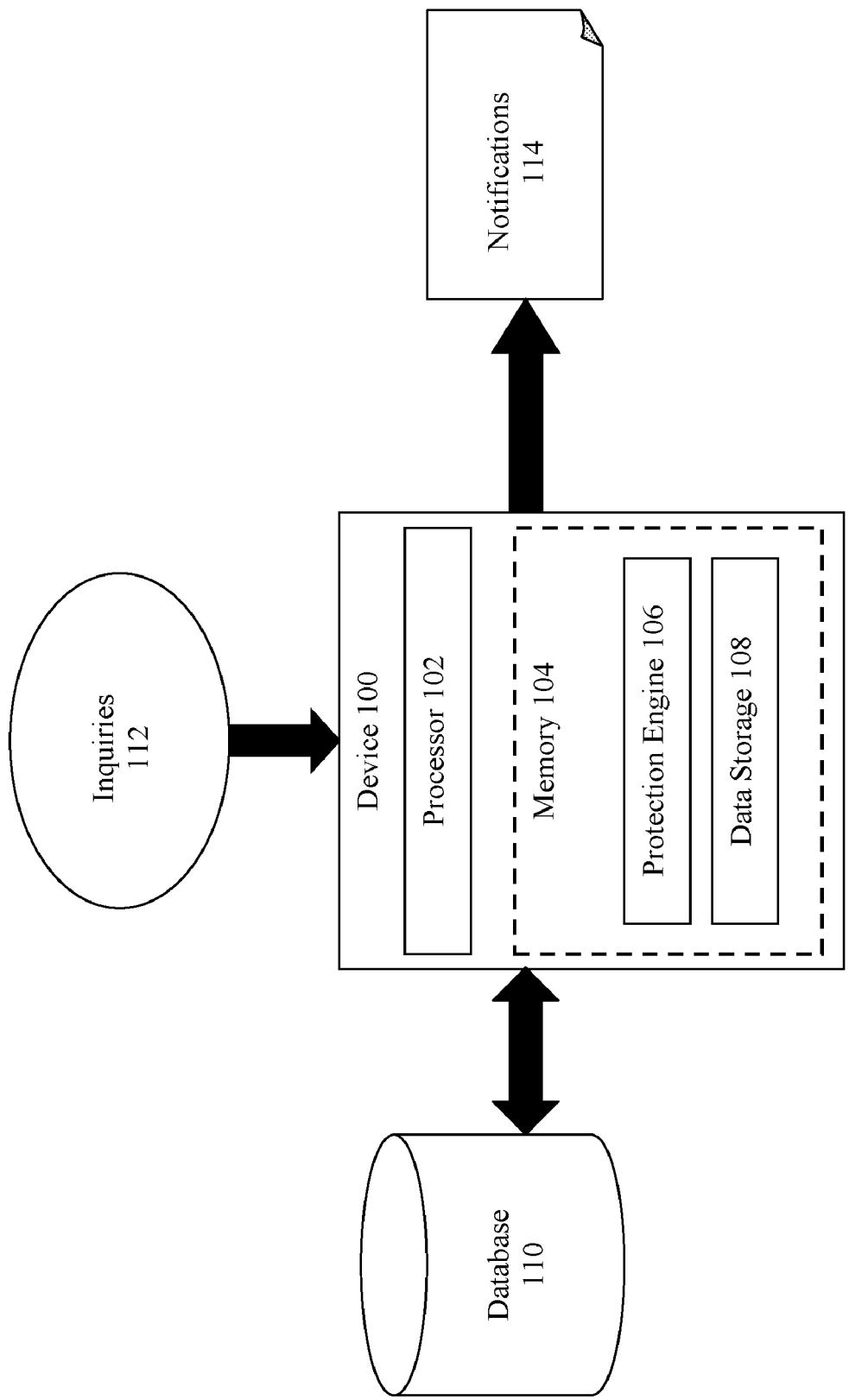
FIG. 1 illustrates a system used to monitor for theft of a child's identity according to one embodiment of the present invention.

Throughout the description, for the purposes of explanation, numerous specific details are set forth in order to provide a thorough understanding of various embodiments of the present invention disclosed herein. It will be apparent, however, to one skilled in the art that the disclosed embodiments may be practiced without some of these specific details. In other instances, well-known structures and devices are shown in block diagram form to avoid obscuring the underlying principles of the disclosed embodiments.

Certain aspects and embodiments of the present invention relate to methods and systems for detecting the presence of suspicious events that may detrimentally affect a child and/or preventing access to data, such as credit data, that may be directly or indirectly related to a child. An example of a suspicious event is the theft of a child's identity. Suspicious events can be detected by monitoring a database containing data from one or more sources, detecting a suspicious event represented by the data, and notifying the child's parent upon the detection of a suspicious event. Certain embodiments of the present invention create a child file that include personal information of the child. The child file can be locked by associating an electronic notice to the child file. The locked child file can be used to prevent access to a database, such as a database including credit data, to use, establish, or obtain information associated with the child. Credit data can include credit files associated with individuals or other entities that are used to measure and establish credit for commercial or other purposes. The child file can be used to detect uses of the child's social security number (SSN) to set up a credit file in a name other than the child. In some embodiments, the child file can be used to prevent credit inquiries including at least part of the personal information associated with a child from reaching the database.

A "child" as used herein may be a minor of age sixteen or less or, in some embodiments, an adult. A protection engine can receive a child's personal information from one or more of the child's parents, along with personal information of the parent. A child's personal information may include name, address, date of birth, sex, social security number, certified copy of their birth certificate, or other information. The parent's identity is authenticated using the parent's personal information. The protection engine may use all or part of the child's personal information and the parent's personal information to authenticate the relationship between the parent and the child. A "parent" as used herein can include one or more natural parents, such as a father or a mother, or one or more guardians of a child, including official as determined by a court of law or an unofficial guardian.

The protection engine uses the child's personal information to search credit data within the database for a pre-existing credit file associated with the child's personal information. If no pre-existing credit file is found, which should be the case in most instances unless the child's identity has already been stolen and used, a child file is developed for the child. The child file can include part or all of the personal information of the child. For example, the child file can include the child's name, date of birth, SSN, or other personal information. The protection engine can then lock the child file until the child reaches a pre-set age to prevent credit files in a credit database from being accessed and used as a basis for credit by the child or another individual that has stolen the child's identity. In some embodiments, the SSN of the child may be verified. The verified SSN can be used to prevent identities for credit purposes from being created that use the verified SSN, but are associated with names other than the child's name.

Locking the child file can include associating an electronic notice on the child file that can prevent inquiries or other requests that include information in the child file from access to a database including credit data. Locking a child file can prevent any credit data in the database from being accessed or information in the child file from being used to establish credit with a commercial entity, such as for purposes of obtaining a credit card, a car loan, a student loan, or the like.

The protection engine then monitors the child file for any inquiries or other attempts to access the credit data in a database using part or all of the information in the child file. The locked child file can prevent access to the credit data in the credit files stored in a database and attempts to access the credit data using information in the child file can indicate a danger to the child or the child's personal information. The protection engine may also monitor credit data to detect uses of the child's social security number. For example, a person that is not the child may use the child's social security number to set up a separate credit file, not in the child's name, or to obtain credit using the child's name. The protection engine can monitor and detect any activity involving the use of the child's social security number or information in the child file constantly or in intervals.

As an example, the protection engine may obtain an activity report of the child file and any attempts to use the child's social security number on a periodic basis, such as daily, weekly, or monthly, where the activity report includes information regarding inquiries or attempts to access the credit data or use the child's social security number. If the protection engine detects such events, it can automatically notify the parent using contact information provided by the parent in their personal information. The parent may be notified using any method. Examples of such methods include telephone call, email, and short message service (SMS).

When the child turns sixteen or some other pre-set age, the child file may be unlocked or otherwise deleted to allow the child to build the child's own credit and monitoring by the protection engine may be stopped. While the child file is locked, recordation of attempts to access credit data using the personal information in the child file may be removed to prevent them from detrimentally affecting the child's credit score when he or she begins building their own credit.

In some embodiments, the protection engine may also use the address associated with the child to monitor sex offender data and notify the child's parent if a sex offender moves or begins living near the address associated with the child.

Illustrative System Implementation

Various systems may be used to establish and monitor one or more types and sources of data within the database for any suspicious events; and notify the parent of the child upon the detection of a suspicious event. "Suspicious events" as used herein refers to any event or occurrence that may affect the child, such as events that may detrimentally affect the child. Examples of such suspicious events include data indicating a child's identity may have been stolen and data indicating a convicted criminal lives within a pre-set radius of the child's home address.

FIG. 1 illustrates a system according to one embodiment of the invention that can be used to monitor for and detect data indicating suspicious events, including theft of a child's identity. The system includes a device 100 that includes a processor 102 for executing computer-executable code stored in a computer-readable medium, such as memory 104. Examples of device 100 include a computer and a server. The computer-executable code can include protection engine 106 and data stored in data storage 108. As described in more detail below, the protection engine 106 may be executed by the processor 102 to perform various tasks in accordance with various embodiments of the present invention.

The device 100 is in communication with a database, such as database 110, that contains various types of data accessed by the protection engine 106. Examples of the types of data stored in the database 110 include credit data, criminal data, and record data. Credit data can include credit files or other similar data associated with individuals and entities. The credit data may be from a credit bureau that collects personal, credit-related, and financial information concerning individuals and organizes the information into data stored in credit files. Inquiries 112 may be submitted to these sources of credit data through device 100 from entities, such as commercial issuers of credit, to obtain credit information associated with an individual. For example, a commercial entity can request a search of the credit data created by a credit bureau for example, using an individual's social security number "SSN" or other personal information. The credit data concerning the individual is then returned to the commercial entity through the device 100 or directly from the database 110. The commercial entity can use the credit data associated with the individual to determine the credit worthiness of the individual.

Criminal data can include data on criminals, such as identification and current address of individuals convicted of a crime. The criminal data may be collected from one or more government entities, such as a state or national sex offender registry, and organized into searchable criminal data.

The record data includes additional data that is not included in the credit data or criminal data, but may be useful to the protection engine 106. For example, record data may include birth certificate data for individuals, or Social Security Administration records, that, as explained in more detail below, may be used to verify the relationship between a child and a purported parent of the child.

The device 100 may be in communication with database 110 over a network, such as a LAN, WAN, the Internet or similar networks, or connected directly via a serial, coaxial, or other similar cable connection. In other embodiments the device 100 includes database 110 in data storage 108. Database 110 may be any type of device that is adapted to store data. Database 110 may be one database of multiple databases located at the same or different locations.

A parent can communicate with the device 100 either electronically over a network or manually using mail for example. If the information is communicated manually, the services of a data entry technician may be used to enter the information from the mail into the device 100. The information entered into the device 100 can be used to establish an account for a child. Establishing an account for the child can include establishing a child file for the child and storing the child file in data storage 108 or, in some embodiments, database 110. The parent can request that the protection engine 106 monitor the child file and/or database 110 for data indicating a suspicious event using the personal information of the child. If the protection engine 106 detects a suspicious event, the protection engine 106 can issue a notification 114 to the parent regarding the suspicious event.

A parent can be notified via any method, such as email, SMS, postal mail, telephone, or via a web page of a detected suspicious event. For example, an email may be provided to the parent that indicates a suspicious event has been detected and provides an address, such as a uniform resource locator (URL), of a website on the Internet at which the parent can access more information about the detected suspicious event. The website may allow the parents to login to a personal webpage using a password or other identification method. The website may include the notification 114 of the suspicious event, a description of the suspicious event and any related information, along with instructions on how to investigate further and/or who to contact to discuss the suspicious event.

Illustrative Methods for Detecting Theft of a Child's Identity

Figure 2:
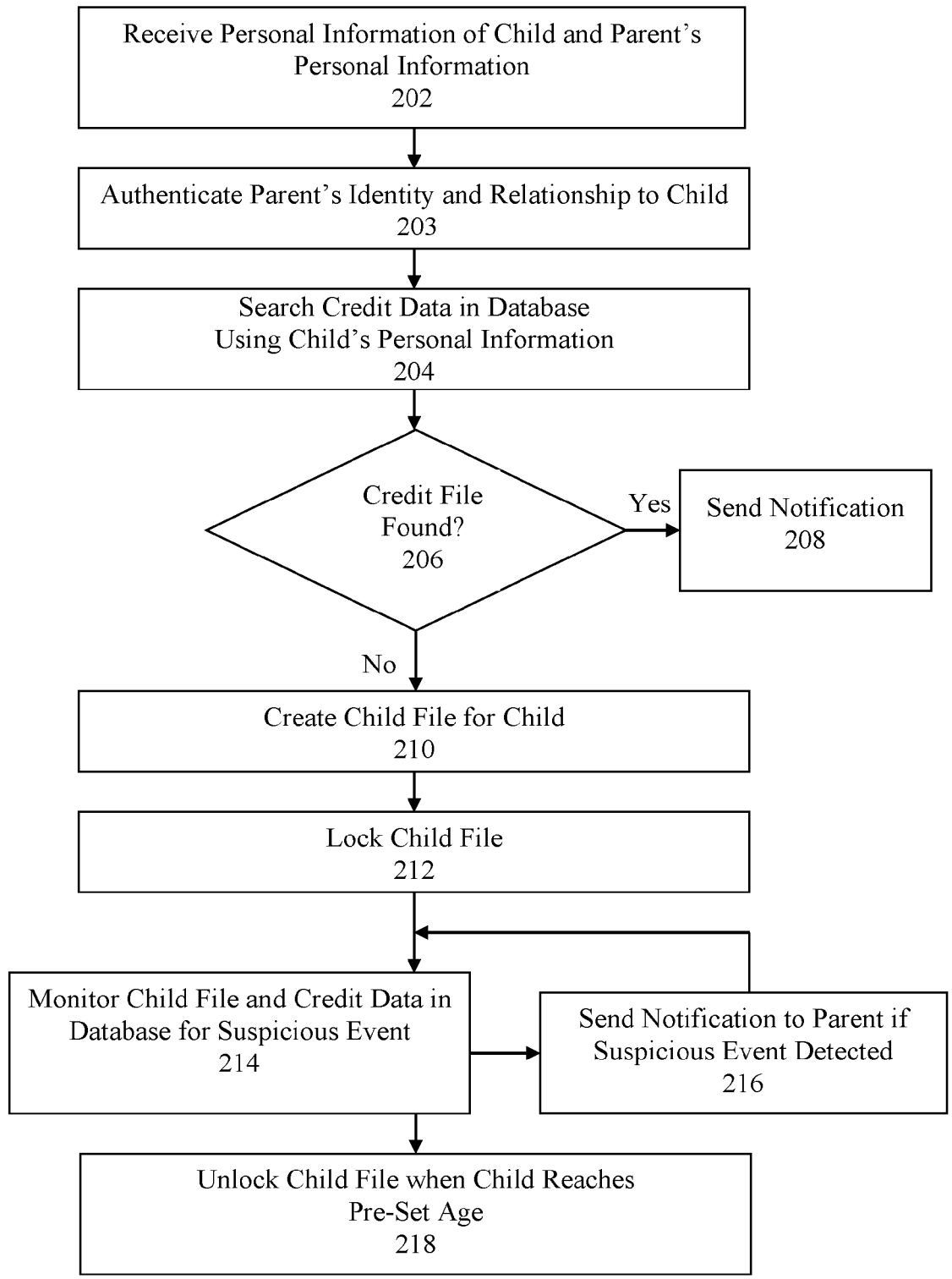
FIG. 2 is a flow chart of a method for monitoring for theft of a child's identity according to one embodiment of the present invention.
Figure 3:
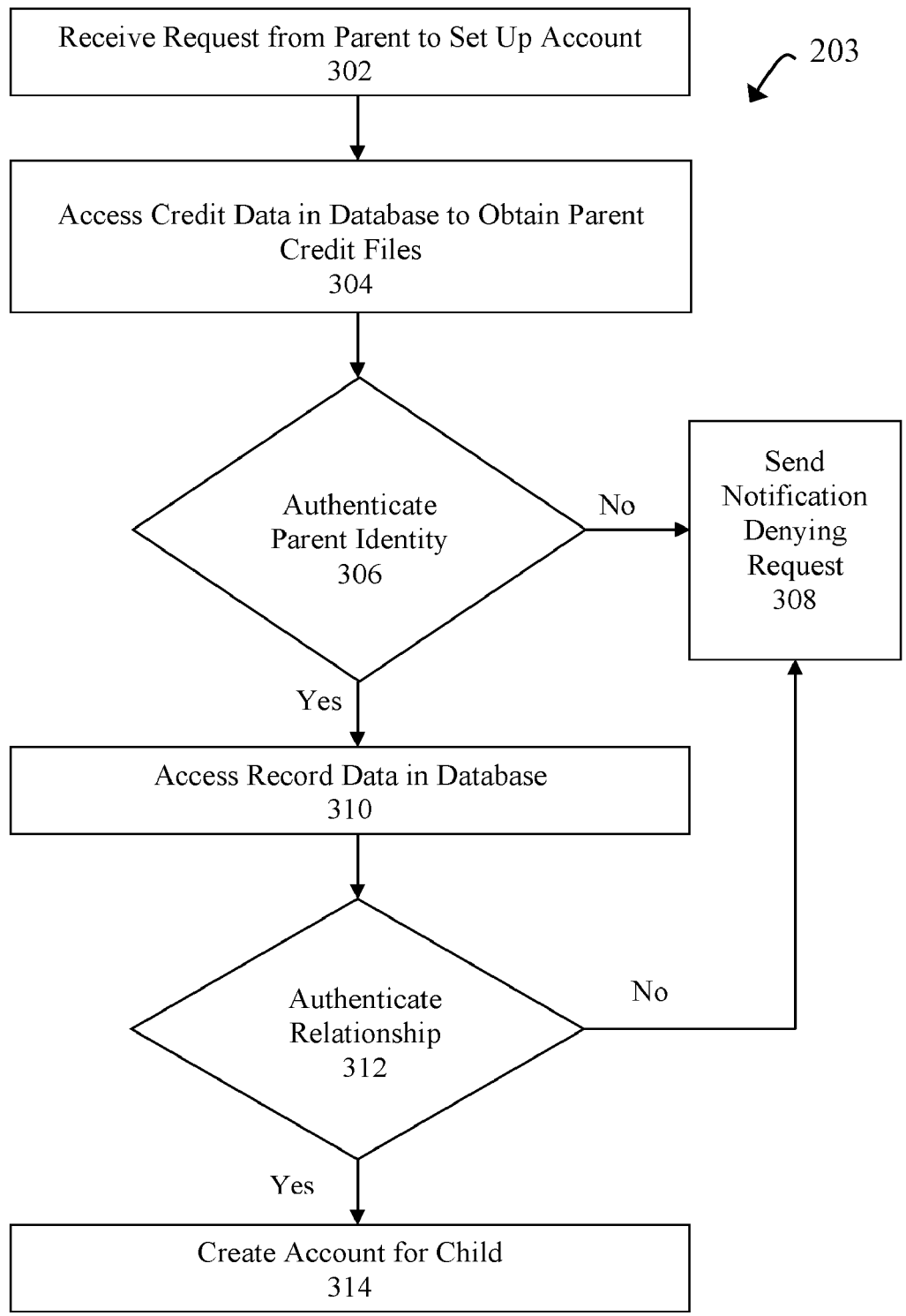
FIG. 3 is a flow chart of a method for authenticating the identity of the parent and a relationship between the parent and the child according to one embodiment of the present invention.
Figure 4:
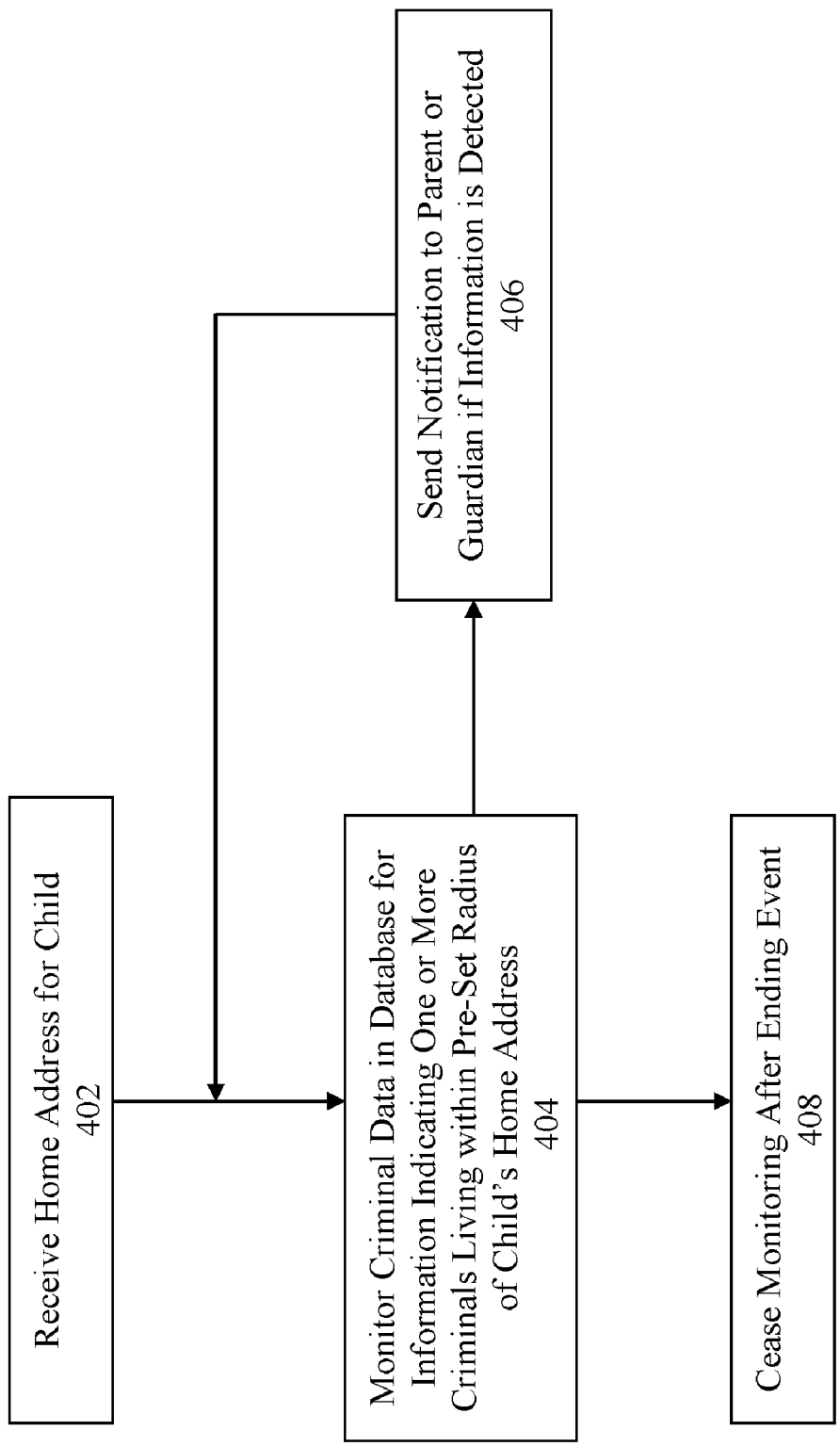
FIG. 4 is a flow chart of a method for monitoring for criminals moving within a pre-set radius of a child's home address according to one embodiment of the present invention.

Various methods may be used to establish a child file for a child and monitor child file and/or a database for suspicious events associated with information in the child file, use of the child's SSN, or criminals located close to a child's home. FIGS. 2 and 4 illustrate methods according to certain embodiments of the invention for monitoring a child file and/or database containing one or more sources of data and detecting suspicious events associated with a child's information. For purposes of illustration only, the elements of this method are described with references to the system depicted in FIG. 1 and authentication processes depicted in FIG. 3. Numerous other system implementations and authentication processes are also possible.

The method in FIG. 2 begins at block 202 with the device 100 receiving personal information of a child and personal information of the child's parent. The child's personal information can include one or more of name, address, sex, date of birth, SSN, a certified copy of their birth certificate or other information relevant to identifying the child or determining the relationship between the child and the parent. The parent's personal information can include name, address, sex, date of birth, SSN, email address, telephone number, home address, or other information relevant to confirming the identity of the parent and/or contacting the parent. In some embodiments, a request to set up an account for the child is also received.

The child's personal information and parent's personal information may be received electronically, such as over a network, or manually, such as via mail. If the information is received manually, a data entry technician may be used to enter the personal information into the device 100. The protection engine 106 may organize the child's personal information and parent's personal information into a profile for the child and store the profile in the data storage 108 to set up an account for the child.

In block 203, the protection engine 106 authenticates the identity of the parent and the parent's relationship to the child. In some embodiments, the parent's personal information is used to access credit or other data stored in database 110 and associated with the parent. A series of questions is formulated based on the data and provided to the parent. An example of one question is to ask the parent to identify the lender of his or her home mortgage. The protection engine 106 receives answers to the questions and authenticates the parent if the answers are correct.

The relationship between the parent and child can be authenticated by confirming the person associated with the parent's personal information is a parent of the child. For example, record data may be accessed that includes government or court data on the relationship between an SSN of the child and an SSN of the parent to confirm the relationship. In some embodiments, the personal information received for the child can include a certified copy of a birth certificate that identifies the parent. Certain embodiments of the present invention authenticate the parent's identity, but not the relationship between the parent and the child.

After authentication, the protection engine 106 establishes a profile for the child in data storage 108. In block 204, the protection engine 106 can use the child's personal information to search credit data in database 110 to determine if a credit file has already been established for the child or the child's SSN. For example, the protection engine 106 may use at least part of the child's personal information, such as the child's SSN, to request a search of the credit data in database 110. The database 110 may return credit files or part of a credit file that matches the personal information provided by the protection engine 106. If no credit file or data exists for the child or child's SSN, an indicator may be returned indicating that no credit data exists.

In block 206, the protection engine 106 determines if any returned credit data are associated with the child or the child's SSN. Typically, a credit file for the child is not found in the credit data stored in database 110. Because it is expected that no credit files associated with the child exist, the presence of a credit file may indicate that the child's identity has already been stolen. If the protection engine 106 determines that returned credit files are associated with the child or the child's SSN, the protection engine 106 sends a notification 114 to the child's parent in block 208.

The notification 114 may be sent in any format and by any method. For example, the protection engine 106 may store contact information for the parent, such as an email address, physical address, or telephone number, with the child's profile and automatically send a notification 114 using the contact information via email, telephone call, mail, text message, interactive voice response telecommunications application, or other communication method. The notification 114 may include a notice that a credit file for the child of the child's SSN was found and any related information, along with instructions on how to investigate further and/or the entity to contact to discuss the detected credit file. The notification 114 may also be sent to a credit fraud investigative unit of a commercial or governmental entity, so that it can investigate the presence of the credit file. In some embodiments of the present invention, the protection engine 106 can send a communication to the parent with a link to a website, along with a short explanation that the protection engine 106 detected a suspicious event that is a credit file associated with the child or child's SSN and that the website contains more information. The protection engine 106 can send more detailed information to the website and require the parent to enter a password or other credentials to view the detailed information.

If no credit file is found using the child's personal information, the protection engine 106 creates a child file for the child in block 210 and stores the child file in data storage 108 or, in some embodiments, the database 110. The child file can include all or part of the personal information of the child. For example, the child file can include the child's name, date of birth, and SSN. In some embodiments, the child file includes the home address of the child and other personal information.

In block 212, the protection engine 106 causes the child file to be locked. Locking the child file can include associating an electronic notice, such as a flag, to the child file to indicate the child file is locked and that information that matches personal information in the child file cannot be used to access credit data in database 110. For example, inquiries from a commercial entity that include at least part of the personal information in the child file cannot be used to access credit data to determine the credit worthiness of a customer. The customer may be any one of (1) the child, (2) an identity thief attempting to use the child's identity, or (3) a legitimate customer in which the inquiry contains incorrect information that coincidentally matches the child's personal information.

In block 214, the child file and credit data within database 110 are monitored for a suspicious event. Suspicious events can include: (1) inquiries submitted that include part of the personal information in the child file; (2) use of the child's SSN to create a separate credit file for the child or someone else; and (3) credit activity information submitted for inclusion in a credit file for the child by a commercial entity or otherwise. The child file may be monitored by the protection engine 106 or a separate engine that is associated with the database 110 if the child file is stored in database 110. The protection engine 106 can request updates for any information concerning the child file or SSN from the credit data in the database 110 continuously or on a periodic basis, such as weekly, monthly, quarterly, or otherwise. The separate engine associated with the database 110 may continuously or periodically check for any updated information concerning the child file or SSN and send updates to the protection engine 106.

While monitoring the child file and credit data in database 110, a suspicious event may be detected. If a suspicious event is detected, the protection engine 106 sends a notification 114 to the parent in block 216. The notification 114 may be sent via any communication method, including those described above, and can include information describing the suspicious event and any related information. In some embodiments, the notification 114 includes a brief notice that the suspicious event has occurred and directs the parent to a website that includes detailed information associated with the suspicious event and its occurrence. After the notification 114 is sent, monitoring of the child file and/or credit data resumes in block 214.

The system may continue to monitor the child file and use of the child's SSN until the child reaches a pre-set age. The pre-set age may be an age that the protection engine 106 sets based on statistics regarding the age at which persons normally become active credit users, or it may be set by the parent. In some embodiments, the parent can select the pre-set age up to a maximum age of eighteen years old, for example. When the child reaches the pre-set age, the protection engine 106 causes the child file to unlock in block 218. Unlocking the child file allows the child to become an active credit user without triggering a suspicious event by establishing his or her own credit. In some embodiments, the child file remains locked until the child reaches the pre-set age, even if the parent cancels the child's account with the protection engine 106 or stops the monitoring service.

Illustrative Method for Authenticating Parent and Child Relationship

Unfortunately, those with a propensity to seek gains through fraud, or otherwise, may utilize the freedom provided to a parent to use systems according to various embodiments of the present invention to perpetrate deception in the parent's own identities or relationships to the child that the system seeks to protect. For example, one with ill intent who has motivation to cause difficulties in the lives of children for whom they are not a parent may attempt to lock a child's child file, even though the actual parent and/or the child wishes for the child file to remain unlocked for various reasons. FIG. 3 illustrates an embodiment of authentication processes with a goal to prevent those with ill intent from succeeding in fraudulent activities. Other authentication processes may be implemented.

This authentication process begins in block 302 when the protection engine 106 receives a request from a parent of a child (or one purporting to be a parent of a child) to set up an account for the child to reduce or eliminate theft of the child's identity. In some embodiments of the present invention, the protection engine 106 receives the request from a webpage over the Internet and can automatically communicate with the parent to request additional information, as needed, such as the particular personal information that the protection engine 106 needs to set up the account for the child and authenticate the parent. Personal information can include name, current address, date of birth, SSN, and other information. In some embodiments of the present invention, the personal information may include government-issued documentation that shows the relationship the parent has with the child. This documentation may include a birth certificate, adoption certificate, court order, social security card, or, in the case of families in which parents are divorced, court documents identifying the person or persons who have custody of the child. The protection engine 106 may request that certified copies of these documents be sent to the entity that controls the device 100 via mail or, using verified electronic certification methods, may allow the parent to submit these documents electronically by following pre-set criteria that certifies the authenticity of the documents.

In block 304, the protection engine 106 accesses credit data in the database 110 that includes a credit file for the parent using the personal information for the parent. The credit file includes financial related data on credit accounts the parent has opened and identification of the commercial entities from which the parent has entered credit related agreements. The credit file may be used to authenticate the identity of the parent. For example, the protection engine 106 may compare the personal information provided by the parent to personal information stored in the credit file to determine if both sets of personal information, such as SSN, match and upon a match, authenticate the identity of the parent.

In some embodiments of the present invention, the protection engine 106 may generate a series of questions based on data stored in the credit file and provide the questions to the parent. For example, questions may ask the parent to identify the company through which they have a mortgage on the parent's house or other property. The protection engine 106 can receive answers to the questions and determine whether the parent correctly answered the questions posed. If a specified number of questions are answered correctly, the protection engine 106 authenticates the parent.

In block 306, the protection engine 106 determines if the identity of the parent is authenticated. If the protection engine 106 fails to authenticate the parent using any method, a notification 114 is sent to the parent or guardian declining his or her request to set up an account for the child in block 308.

If the parent is authenticated, the protection engine 106 accesses record data from database 110 to obtain any record data associated with the parent and child relationship. Record data can include data from a commercial or government entity that includes family relationship records, such as census data, birth certificates, tax return filings, court documents, Social Security Administration records or other available record data that is associated with the personal information for the child and/or parent.

The protection engine 106 can use the record data to authenticate a relationship between the parent and the child in block 312. For example, the protection engine 106 may identify a SSN of the child from the personal information of the child and use the child's SSN to access record data from a government entity, such as the Social Security Administration or Internal Revenue Service, associated with the child's SSN. The record data may include information indicating the identity of the parent of the child. For example, the record data may include a familial link, or indicating a familial link, that identifies the SSN of the parent and its connection with the SSN of the child. If a link is identified, the protection engine 106 authenticates the relationship between the child and the parent.

The relationship can be authenticated using other types of record data. For example, the record data can include a certified copy of the child's birth certificate, received from the parent or from a government source. The protection engine 106 can compare the information on the birth certificate with the parent's information to determine if the information matches. If a match is determined, the protection engine 106 can authenticate the relationship. Other record data that can be used to authenticate the relationship includes a court order, such as an adoption order.

If the protection engine 106 fails to authenticate the parent and child relationship, a notification 114 is sent to the parent declining his or her request to set up an account for the child in block 308. The notification 114 can be in any of the formats described above as well as other possible formats. If the protection engine 106 authenticates the relationship, an account for the child is created in block 314.

Using authentication methods according to various embodiments of the present invention may allow for a parent to select who can change settings associated with the child's account (such as unlocking the child file). For example, after a parent is authenticated, the parent can submit information or request that a second person, that may be a biological parent to the child but otherwise is not involved in the child's life, be restricted from having access to the child's account. Furthermore, an authenticated parent may provide other individuals who are not a parent (e.g., grandparents) with permission to access the child's account.

Illustrative Method for Criminal Location Notification

As discussed above, some aspects of the present invention relate generally to providing a parent with notifications regarding suspicious events that may detrimentally affect children. In some embodiments of the present invention, the protection engine 106 can access criminal data within the database 110 and provide notifications to a parent when information in the criminal data indicates the child may be detrimentally affected. Criminal data can include data on convicted criminals, and in particular, data on convicted criminals who are not confined to a jail or prison. Parents are continually sensitive to convicted criminals, in particular convicted child molesters or other sex offenders, moving close to a child's residence. Although many states provide a database, accessible via the Internet, with information on the location of such convicted criminals, the databases require a parent to diligently access the database to obtain the latest updated information. Using the ability of the protection engine 106 to access multiple sources of data and provide notifications to parents, such diligence may be unnecessary.

FIG. 4 illustrates one embodiment of a method for monitoring criminal data in the database 110 and providing a parent with notifications when a convicted sex (or other) offender moves within some distance from the child's residence. The method begins in block 402 with the protection engine 106 receiving a residence address or other information associated with the child. The residence address may be included in the personal information submitted by the parent when he or she requests that the protection engine 106 set up an account or submitted when the parent requested the monitoring service offered by certain embodiments of the present invention, including the embodiment illustrated in FIG. 2.

In block 404, the protection engine 106 accesses and monitors criminal data stored in the database 110 for identification of criminals that live or move to an address within a pre-set radius of the child's residence address. The criminal data can include data on criminals convicted for one or more types of crimes (e.g., sex offender) and those who are not in jail or prison. The criminal data can include the convicted criminal's name, age, picture, or other personal information, the offense for which the criminal was convicted, and the convicted criminal's home address. The protection engine 106 may be adapted to continuously or periodically access the criminal data in the database 110 and perform a search for convicted criminals who live within a pre-set radius of the child's residence address. The pre-set radius may be a standard radius set by managers of the protection engine 106, such as based on statistics of repeat offenders and the location of such offenses relative to the criminal's homes, or set by the parent. For example, the protection engine 106 may request that the parent enter a radius of which the protection engine 106 will search relative to the child's residence.

In block 406, the protection engine 106 can analyze the search results and send a notification 114 to the parent if it detects a convicted criminal living within the pre-set radius of the child's residence address. The notification 114 may identify the criminal, the location of the criminal's home, and the offense for which the criminal was convicted. The notification 114 may be sent via any communication method, including those discussed above. After the protection engine 106 sends the notification, it can resume monitoring the criminal data within the database 110 in block 404.

The protection engine 106 may continue to monitor the criminal data within the database 110 until an ending event occurs. When the ending event occurs, the protection engine 106 ceases monitoring the criminal data in block 408. An ending event may be any event that results in the protection engine's 106 monitoring of the criminal data to be unnecessary. Examples of ending events include (1) the child is no longer under the care of the parent; (2) the child is no longer a child; (3) the parent cancels the child's account with the protection engine 106; and (4) the parent cancels the criminal data monitoring service offered by the protection engine 106.

General

Various aspects and embodiments of the present invention have been described with application to children. However, those of ordinary skill in the art will readily understand that various aspects and embodiments of the present invention can be applied to individuals who are not children (i.e., adults) and entities, such as groups of people, whether children or not. Furthermore, those of ordinary skill in the art will readily appreciate that certain embodiments of the present invention may be used in applications not disclosed above. For example, the protection engine 106 may receive a notice that a commercial entity has submitted an inquiry for data in a credit file that includes personal information associated with a child. The protection engine 106 may be adapted to automatically notify the commercial entity that the person that is the subject of the inquiry is a child.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

We claim:

1. A method for detecting an indication of a suspicious event associated with personal information of a child, comprising:
   receiving personal information representing a social security number of the child, a name of the child, and a home address of the child;
   receiving parent personal information representing contact information for a parent of the child;
   creating a child file for the child and storing the child file on a non-transient computer-readable medium, the child file for the child comprising the personal information representing the social security number of the child and the name of the child;
   in response to creating the child file for the child, locking the child file for the child by association an electric notice with the child file for the child to prevent credit data stored in at least one database and asssociated with at least part of the personal information of the child from being used to establish credit with a commercial entity, wherein the electronic notice indicates that the commercial entity requesting access to the credit data is prohibited from using the personal information to access the credit data;
   monitoring the child file and data stored in the at least one database for the indication of the suspicious event using the personal information representing the social security number of the child, the at least one database comprising criminal data representing physical addresses of a plurality of criminals and the credit data comprising a plurality of credit files, the suspicious event comprising at least one of:
   the criminal data indicating at least one of the plurality of criminals is associated with a physical address within a pre-set radius of the home address for the child;
   an indication of an inquiry comprising at least part of the personal information of the child;
   or an indication of the social security number of the child associated with at least one of the plurality of credit files; and
   transmitting a notification to the parent using the parent personal information representing contact information for the parent, the notification being transmitted after detecting the indication of the suspicious event, the notification comprising information associated with the indication of the suspicious event.

2. The method of claim 1, wherein monitoring the child file and the data stored in the at least one database for the indication of the suspicious event using the personal information representing the social security number of the child comprises:
   monitoring for credit inquiries requesting credit information associated with the child and comprising at least part of the personal information in the child file; and
   monitoring the credit data stored in the at least one database, the credit data comprising the plurality of credit files.

3. The method of claim 2, further comprising:
   searching the plurality of credit files using the personal information representing the social security number of the child;
   detecting a credit file for the child exists; and
   wherein the notification comprises an indication that the credit file for the child exists.

4. The method of claim 1, further comprising:
   authenticating an identity of the parent using the parent personal information; and
   authenticating a relationship of the parent with the child using the parent personal information.

5. The method of claim 4, wherein authenticating the relationship of the parent with the child comprises:
   accessing record data comprising at least one of:
      data representing tax-related information of the parent;
      data representing a birth certificate of the child; or
      data representing Social Security Administration information associated with the child and the parent; and comparing the record data to the parent personal information and the personal information representing the social security number of the child and the name of the child to confirm the relationship of the parent with the child.

6. The method of claim 1, further comprising:
unlocking the child file for the child when the child reaches a pre-set age by removing the electronic notice.

7. A system for detecting an indication of a suspicious event associated with personal information of a child, the system comprising:
a processor-based device comprising a protection engine stored on a non-transient computer-readable medium, the processor-based device being in electronic communication with at least one database, the protection engine being configured to:
receive the personal information representing a social security number of the child, a name of the child, and a home address of the child;
receive parent personal information representing contact information for a parent of the child;
create and store a child file for the child, the child file for the child comprising the personal information representing the social security number of the child and the name of the child;
in response to creating the child file for the child, cause the child file for the child to be locked by causing an electronic notice to be associated with the child file for the child to prevent credit data stored in the at least one database and associated with at least part of the personal information of the child from being used to establish credit with a commercial entity, wherein the electronic notice indicates that the commercial entity requesting access to the credit data is prohibited from using the personal information to access the credit data;
monitor the child file and data stored in the at least one database for the indication of the suspicious event using the personal information, the at least one database comprising criminal data representing physical addresses of a plurality of criminals and the credit data comprising a plurality of credit files, the suspicious event comprising at least one of:
the criminal data indicating at least one of the plurality of criminals is associated with a physical address within a pre-set radius of the home address for the child;
an indication of an inquiry comprising at least part of the personal information of the child; or
an indication of the social security number of the child associated with at least one of the plurality of credit files; and
transmit a notification to the parent using the parent personal information representing contact information for the parent, the protection engine being configured to transmit the notification after detecting the indication of the suspicious event, the notification comprising information associated with the indication of the suspicious event.

8. The system of claim 7, wherein the protection engine is configured to transmit the notification to the parent using the parent personal information representing contact information for the parent by transmitting an email message to an email address included in the parent personal information representing contact information for the parent.

9. The system of claim 8, wherein the email message comprises an address representing a location of a website on a network, the protection engine being configured to provide a webpage for the website, the webpage comprising the indication of the suspicious event.

10. The system of claim 7, wherein the protection engine is configured to: cause a search of the plurality of credit files to be performed using the personal information representing the social security number of the child; detect the credit file for the child exists; and wherein the notification comprises an indication that the credit file for the child exists.

11. The system of claim 7, wherein the protection engine is configured to unlock the child file for the child when the child reaches a pre-set age by removing the electronic notice.

12. The system of claim 7, wherein the parent personal information represents a social security number of the parent, the protection engine being configured to:
authenticate an identity of the parent using the parent personal information; and
authenticate a relationship of the parent with the child using the parent personal information.

13. A non-transitory computer-readable medium on which program code is stored, the program code comprising:
program code for receiving personal information representing a social security number of a child, a name of the child, and a home address of the child;
program code for receiving parent personal information representing contact information for a parent of the child;
program code for creating a child file for the child, the child file for the child comprising the personal information representing the social security number of the child and the name of the child;
program code for locking, in response to creating the child file for the child, the child file for the child by associating an electric notice with the child file for the child to prevent credit data stored in at least one database and associated with at least part of the personal information of the child from being used to establish credit with a commercial entity, wherein the electronic notice indicates that the commercial entity requesting access to the credit data is prohibited from using the personal information to access the credit data;
program code for monitoring the child file and data stored in the at least one database for an indication of a suspicious event using the personal information, the database comprising criminal data representing physical addresses of a plurality of criminals and the credit data comprising a plurality of credit files, the suspicious event comprising at least one of:
the criminal data indicating at least one of the plurality of criminals is associated with a physical address within a pre-set radius of the home address for the child;
an indication of an inquiry comprising at least part of the personal information of the child; or
an indication of the social security number of the child associated with at least one of the plurality of credit files; and
program code for transmitting a notification to the parent using the parent personal information representing contact information for the parent, the notification being transmitted after detecting the indication of the suspicious event, the notification comprising information associated with the indication of the suspicious event.

14. The non-transitory computer-readable medium of claim 13, wherein the program code for transmitting the notification to the parent using the parent personal information representing contact information for the parent comprises program code for transmitting an email message to an email address included in the parent personal information representing contact information for the parent.

15. The non-transitory computer-readable medium of claim 14, wherein the email message comprises an address representing a location of a website on a network, further comprising:
   program code for providing a webpage for the website, the webpage comprising the indication of the suspicious event.

16. The non-transitory computer-readable medium of claim 13, further comprising:
   program code for causing a search of the plurality of credit files to be performed using the personal information representing the social security number of the child;
   program code for detecting the credit file for the child exists; and
   wherein the notification comprises an indication that the credit file for the child exists.

17. The non-transitory computer-readable medium of claim 13, further comprising program code for unlocking the child file for the child when the child reaches a pre-set age by removing the electronic notice.

* * * * *

UNITED STATES PATENT AND TRADEMARK OFFICE
CERTIFICATE OF CORRECTION

| | | |
|---|---|---|
| PATENT NO. | : 8,225,395 B2 | Page 1 of 1 |
| APPLICATION NO. | : 12/270197 | |
| DATED | : July 17, 2012 | |
| INVENTOR(S) | : Christopher Colin Puckett Atwood and Jan Elliott-Sinnock | |

It is certified that error appears in the above-identified patent and that said Letters Patent is hereby corrected as shown below:

In the claims:

Column 12, Line 7 (Claim 1, Line 15)
Please change "association an electric" to --associating an electronic--.

Column 14, Line 32 (Claim 13, Line 15)
Please change "electric" to --electronic--.

Signed and Sealed this
Twenty-fifth Day of September, 2012

David J. Kappos
*Director of the United States Patent and Trademark Office*